US007742136B2

(12) United States Patent
Umemoto et al.

(10) Patent No.: US 7,742,136 B2
(45) Date of Patent: Jun. 22, 2010

(54) MANUFACTURING METHOD FOR SHEET WITH ANTI-COUNTERFEIT FUNCTIONS

(75) Inventors: Seiji Umemoto, Ibaraki (JP); Miki Shiraogawa, Ibaraki (JP); Takahiro Fukuoka, Ibaraki (JP); Naoki Takahashi, Ibaraki (JP); Kentarou Takeda, Ibaraki (JP)

(73) Assignee: Nitto Denko Corporation, Ibaraki-Shi, Osaka (JP)

( * ) Notice: Subject to any disclaimer, the term of this patent is extended or adjusted under 35 U.S.C. 154(b) by 247 days.

(21) Appl. No.: 11/280,735

(22) Filed: Nov. 17, 2005

(65) Prior Publication Data

US 2006/0108063 A1 May 25, 2006

(30) Foreign Application Priority Data

Nov. 22, 2004 (JP) ............................ 2004-337473

(51) Int. Cl.
*G02F 1/1335* (2006.01)
*C09K 19/02* (2006.01)

(52) U.S. Cl. ........................ 349/115; 349/175; 349/176

(58) Field of Classification Search ................. 349/115, 349/86-94, 175-176, 187-192; 428/1.1-1.62
See application file for complete search history.

(56) References Cited

U.S. PATENT DOCUMENTS 5,393,099 A 2/1995 D'Amato
5,574,790 A 11/1996 Liang et al.
6,061,122 A * 5/2000 Hoshino et al. ............... 356/71
2001/0020935 A1 9/2001 Gelbman
2002/0110651 A1* 8/2002 Suzushi ...................... 428/1.5
2003/0104144 A1* 6/2003 Hammond-Smith et al. ..... 428/1.21
2004/0046926 A1 3/2004 Ishizaki (Continued)

FOREIGN PATENT DOCUMENTS

JP 8-334618 12/1996

(Continued)

OTHER PUBLICATIONS

Kim et al. "Short pitch cholesteric electro-optical device stabilized by nonuniform polymer network." Appl. Phys. Let. 86 16118 (2005).*

(Continued)

*Primary Examiner*—David Nelms
*Assistant Examiner*—Jessica M Merlin
(74) *Attorney, Agent, or Firm*—Westerman, Hattori, Daniels & Adrian, LLP

(57) ABSTRACT

A sheet with anti-counterfeit functions for making counterfeiting highly difficult in the case where authentication information is recorded using the properties of cholesteric liquid crystal is provided. A cholesteric liquid crystal layer 110 having a selective reflected wavelength band in at least the visible light region is provided in such a manner that this cholesteric liquid crystal layer 110 is a single layer of which thickness is approximately uniform, and an authentication region 112 of which selective reflected wavelength band is different is provided in at least one place. Preferably, an adhesive layer 130 is provided on one side of the cholesteric liquid crystal layer 110. Preferably, a base 120 is provided between the cholesteric liquid crystal layer 110 and the adhesive layer 130. Preferably, a light absorbing layer 140 is provided on adhesive layer 130 of the cholesteric liquid crystal layer 110.

7 Claims, 3 Drawing Sheets

U.S. PATENT DOCUMENTS

| | | | | |
|---|---|---|---|---|
| 2005/0162585 | A1 * | 7/2005 | Komitov et al. | 349/88 |
| 2006/0061698 | A1 * | 3/2006 | Chen et al. | 349/12 |

FOREIGN PATENT DOCUMENTS

| | | | |
|---|---|---|---|
| JP | 11-42875 | | 2/1999 |
| JP | 11-151877 | | 6/1999 |
| JP | 2001-232978 | | 8/2001 |
| JP | 2001-246886 | A | 9/2001 |
| JP | 2001-525080 | | 12/2001 |
| JP | 2003-149439 | A | 5/2003 |
| JP | 2004-531923 | A | 10/2004 |

OTHER PUBLICATIONS

Japanese Office Action dated Oct. 21, 2009, issued in corresponding Japanese patent application No. 2004-337473.

* cited by examiner

MANUFACTURING METHOD FOR SHEET WITH ANTI-COUNTERFEIT FUNCTIONS

BACKGROUND OF THE INVENTION

1. Field of the Invention

The present invention relates to a sheet with anti-counterfeit functions where authentication information that is difficult to counterfeit for a third a party trying to counterfeit or rewrite with ill intentions or for a third party trying to sell a counterfeit is recorded, and a manufacturing method for the same, as well as an article, an authentication card, a bar code label and an authentication system.

2. Description of the Related Art

Authentication information is recorded in credit cards and ID cards, and whether these are authentic or fake is determined by a magnetic recording portion that is provided on the rear surface of the card, or a hologram that is attached to the front surface of the card. Authentication by means of a hologram image is, for example, disclosed in the US Patents that are cited as the following U.S. Pat. Nos. 5,574,790 and 5,393,099.

In addition, a latent image that cannot be seen with the naked eye without an intervening polarizing plate is formed on a layer that is formed of a polymer liquid crystal material, and a reflective layer is formed on the lower surface thereof in the passport that is disclosed in Japanese Patent Application Laid-open No. 2001-232978. This is irradiated with polarized light, so that reflected light can be observed via a polarizing plate, and thereby, a pattern that is formed as the latent image is authenticated in accordance with the disclosed method.

In addition, as for means for forming a latent image on a retardation film, as is disclosed in Japanese Patent Application Laid-open No. 8-334618, there is a method in which a retardation film is partially heated to a temperature that is no lower than the glass transition point so as to lower the retardation (degree of orientation of molecules) in this portion, as well as a method where a chemical liquid that can dissolve or inflate the retardation film is applied, and thereby, the retardation of this portion is lowered.

Furthermore, there is a method for authentication through observation via a polarizing plate, as disclosed in Japanese Patent Application Laid-open No. 2001-525080, where a latent image is formed by changing the azimuth angle of the optical axis of the retardation layer in an optical element.

In addition, in Japanese Patent Application Laid-open No. 11-42875 and Japanese Patent Application Laid-open No. 11-151877, cholesteric liquid crystal is used as means for authentication. In Japanese Patent Application Laid-open No. 11-42875, selective circular polarized light reflecting properties of cholesteric liquid crystal, and blue shift properties when the angle of view thereof is changed are used, as well as methods for utilizing such cholesteric liquid crystal alone or in combination with a hologram are proposed. In addition, in Japanese Patent Application Laid-open No. 11-151877, a technology is proposed, where a cholesteric liquid crystal layer as that disclosed in Japanese Patent Application Laid-open No. 11-42875 and a hologram image as that disclosed in U.S. Pat. No. 5,574,790 are combined.

In the case of authentication of credit cards or the like as those disclosed in U.S. Pat. Nos. 5,574,790 and 5,393,099, counterfeit of the hologram portion has become a problem. A hologram pattern is manufactured by forming a metal thin film having high reflectance, such as one of aluminum, on an uneven surface in the order of μm. In addition, a hologram pattern is visible to the eye, and in some cases, counterfeiting becomes possible with a cutting apparatus.

In the case of the above-described Japanese Patent Application Laid-open No. 2001-232978, it is disclosed that a latent image is fabricated by carrying out a thermal process on a thermotropic polymer liquid crystal layer. In the case of this system, the means for orienting polymer liquid crystal is an outer force, such as pressure, and therefore, application of high pressure or sufficient shear stress is necessary, in order to gain sufficient orientation. Accordingly, it is necessary for the orientation of liquid crystal to have birefringence within the surface, in order to gain a latent image where the retardant is modified in accordance with the heating pattern, and to do so, it is necessary to apply sufficient shear stress to the liquid crystal, so that the delay phase axis is in a particular direction within the surface in the state of liquid crystal. Therefore, pressure is applied to the base or to the liquid crystal layer while being heated, and thus, problems, such as deformation of the base or the occurrence of damage to the liquid crystal layer, arise, that is to say, a problem arises, where an engraved seal, for example, provides an uneven pattern in such a manner that the latent image becomes visible without using a polarizing plate.

Furthermore, though a latent image can be fabricated in accordance with a method as that disclosed in Japanese Patent Application Laid-open No. 8-334618, it is necessary to heat the retardation film to a temperature that is no lower than the glass transition point and maintain this temperature for a predetermined period of time or longer, in order to cease the retardation of the retardation film. As described above, the degree of molecular orientation in the retardation film is relaxed by heating the retardation film to a temperature that is no lower than the glass transition point, and a problem arises, where the latent image is made visible due to the occurrence of unevenness in the form of the surface. This is the same in the case where heating is carried out in a state of non-contact, and permanent deformation of the film occurs, due to molecular relaxation, even when there is no pressure.

Furthermore, this is the same also as the case where a chemical liquid is applied, and it is necessary to provide a high level of freedom to the polymer that forms the retardation film, because the degree of molecular orientation of the retardation film is relaxed, and as a result, deformation in the form of the surface occurs as a result of relaxation. In the case of application of a chemical liquid, though this can be controlled through permeation of the chemical liquid, the retardation cannot be made sufficiently small when deformation does not occur, because permeation is only in the surface. That is to say, a problem arises, where contrast in the latent image cannot be made sharp. Furthermore, in the case of swelling as a result of the chemical liquid, expansion of the retardation film in the direction of the width occurs at the same time as permeation into the retardation film in the direction of the thickness, and therefore, a problem arises, where sufficient resolution is not gained in the latent image that is formed of portions where the retardation has changed and portions where the retardation has not changed.

In the case of the method that is disclosed in Japanese Patent Application Laid-open No. 2001-525080, very complicated steps are required, such that an optical orientation film is formed and irradiated with ultraviolet rays that are polarized in a predetermined direction through a mask or through scanning, and after that, is irradiated with ultraviolet rays that are polarized in another direction, so that polymerizing liquid crystal or a liquid crystal polymer thin film is formed, and then, this is oriented and fixed. At this time, an optical orientation film for determining the direction in which liquid crystal is oriented is expensive, and furthermore, polymerizing liquid crystal and liquid crystal polymers are relatively expensive. Furthermore, it is necessary to prepare two light sources of polarized ultraviolet rays which are uniform and intense and are polarized in different directions, and efficiency is low and the apparatuses expensive. Liquid crystal layers are generally fabricated through an application process, and it is difficult to control the thickness of the thin film when a certain level of retardation is gained, due to the large birefringence of the liquid crystal.

In addition, in accordance with a method for applying cholesteric liquid crystal as that of Japanese Patent Application Laid-open No. 11-42875, the level of anti-counterfeit is increased by combining liquid crystal and setting of the selective wavelength reflecting band in the circular polarized light with another anti-counterfeit function, such as a hologram image as discussed in Japanese Patent Application Laid-open No. 11-151877. However, a problem arises with the reflecting properties of the cholesteric liquid crystal, where selection of the reflecting properties of the material and the mixture of the materials can be relatively easily reproduced, that is to say, when the mixing ratio of nematic liquid crystal and a chiral agent is identified, this can be easily applied. In addition, even with a combination of a cholesteric layer and a hologram layer, these are simply combined, and therefore, combination becomes easy if counterfeiting of each is easy.

The present invention is provided in view of the above-described situation, and an object thereof is to provide a sheet with highly effective anti-counterfeit functions, where counterfeiting is difficult in the case where authentication information is recorded using the properties of cholesteric liquid crystal.

SUMMARY OF THE INVENTION

<Configuration of Sheet with Anti-Counterfeit Functions>

In order to solve the above-described problems, a sheet with anti-counterfeit functions according to the present invention is characterized by including a cholesteric liquid crystal layer having a selective reflected wavelength band in at least a visible light region, wherein this cholesteric liquid crystal layer is a single layer having an approximately uniform thickness and an authentication region of which the selective reflected wavelength band is different from that of the other regions is provided in at least a portion.

The working effects of this sheet with anti-counterfeit functions are described below. Cholesteric liquid crystal has a structure where the direction of liquid crystal rotates relative to the axis of a twist that is perpendicular to the plane in which the cholesteric liquid crystal is formed. Accordingly, the direction of molecules of the cholesteric liquid crystal is parallel to this plane, and perpendicular to the axis of the twist. In addition, the liquid crystal has a structure where cholesteric molecules in the plane that is perpendicular to the axis of the twist are in a certain direction within a certain orientation domain, due to the properties of the liquid crystal. The distance in the direction of the axis of a twist that is required for the direction of the cholesteric liquid crystal to complete one rotation is cholesteric pitch P. Selective reflected wavelength λr of the cholesteric liquid crystal is represented by index of refraction n and P, as follows.

$$\lambda r = n \cdot P \quad (1)$$

Accordingly, selective reflected wavelength band λr of circular polarized light can be found from the size of anisotropy of the index of refraction of the used liquid crystal, that is to say, the index of refraction of normal light of liquid crystal molecules no, the index of refraction of abnormal light ne, and P.

$$no \cdot P \leqq \lambda r \leqq ne \cdot P \quad (2)$$

In addition, reflective band width Δλr is provided by An, which is the difference between no and ne, and P, as follows.

$$\Delta\lambda r = \Delta n \cdot P \quad (3)$$

In general, cholesteric liquid crystal is a mixture of nematic liquid crystal and a chiral agent for rotating the nematic liquid crystal. The amount of chiral agent is microscopic in comparison with the component of nematic liquid crystal, and therefore, equation (2) can be substituted with index of refraction of normal light no and index of refraction of abnormal light ne of the nematic liquid crystal component of the cholesteric liquid crystal. These no and ne have values inherent to the substance, and can be determined by this. In addition, the optical properties and liquid crystal properties of nematic liquid crystal can be changed by mixing two or more types thereof, and therefore, can be controlled so as to have predetermined properties.

Nematic liquid crystal which usually indicates cholesteric properties is liquid crystal where ne has a large positive value that is greater than no. In accordance with a method for easily controlling the wavelength band that is provided by equation (2), the pitch of the cholesteric liquid crystal can be changed. As described above, the rotation of cholesteric liquid crystal depends on the chiral agent that is added to nematic liquid crystal. Accordingly, the concentration of the chiral agent relative to the nematic liquid crystal is changed, and thereby, the pitch of the cholesteric liquid crystal can be easily changed.

That is to say, in the case where cholesteric pitch P has a value in a range from P1 to P2 in equation (1), selective reflected wavelength band λrp can be found as follows:

$$n \cdot P1 \leqq \lambda rp \leqq n \cdot P2 \quad \text{equation (4)}$$

Furthermore, the anisotropy of the index of refraction of liquid crystal molecules provides $$no \cdot P1 \leqq \lambda rp \leqq ne \cdot P2 \quad \text{equation (5)}$$

As described above, the center wavelength of the selective reflection and the reflective band can be changed by changing cholesteric pitch P, and therefore, in the case where this is changed on the basis of the place, a region where the reflected color is different can be formed. Therefore, a region (pattern) where the selective reflective wavelength band is different is provided in at least one place in the cholesteric liquid crystal layer, and this can be used as an authentication region for carrying out authentication.

Such a region where the reflected color is different is patterned and fixed, and thereby, a patterned cholesteric layer can be formed, providing anti-counterfeiting of which the level is much higher than that in the case where a single cholesteric liquid crystal layer is formed. As for the authentication information that is formed as an authentication region, letters numbers, symbols, shapes and arbitrary combinations of these, or other appropriate patterns, designed shapes and arbitrary combinations of these and letters, for example, can be used, and the authentication information is not limited to any particular form. In the case of the cholesteric liquid crystal layer according to the present invention, information that is formed in the authentication region can be observed under conventional lighting, and there is no concealment, and the liquid crystal layer has properties such that it is difficult to manufacture, providing a high level of anti-counterfeiting. As described above, a sheet with anti-counterfeit functions which is highly difficult to counterfeit in the case where authentication information is recorded using the properties of cholesteric liquid crystal can be provided.

The sheet with anti-counterfeit functions according to the present invention can be combined with authentication means based on other principles, such as, for example, films where a hologram layer is formed or a retardation film where regions having different retardations are formed, so that difficulty of counterfeiting can further be increased.

According to the present invention, it is preferable to provide an adhesive layer on one side of the cholesteric liquid crystal layer. By providing an adhesive layer (for example, a pressure sensitive adhesive layer), the sheet with anti-counterfeit functions can be easily made to adhere to any article.

According to the present invention, it is preferable to provide a base between the cholesteric liquid layer and the above-described adhesive layer. The base can be made to function as lining and can provide a desired strength to the sheet.

According to the present invention, it is preferable for a light absorbing layer to be provided on the above-described adhesive layer side of the cholesteric liquid crystal layer. As for the light absorbing layer, for example, a black sheet of paper can be cited. The contrast between the authentication region and the non-authentication region can be sharpened by providing the light absorbing layer, and thus, readout and confirmation of information becomes easy.

According to the present invention, it is preferable for a transparent hologram layer to be provided on the surface side of the cholesteric liquid crystal layer. A hologram layer is provided in addition to the cholesteric liquid crystal layer which is highly difficult to counterfeit, and thereby, anti-counterfeiting can further be enhanced.

<Manufacturing Method for Sheet with Anti-Counterfeit Functions>

A manufacturing method for a sheet with anti-counterfeit functions according to the present invention is characterized by including:

the step of applying a polymerizing liquid crystal which comprises at least a nematic liquid crystal, a chiral agent and an ultraviolet ray reaction initiator, and exhibits cholesteric liquid crystal properties to a transparent base;

the step of irradiating one side of the applied surface with ultraviolet rays that have been patterned on the basis of authentication information to be recorded; and after this irradiation step, the step of irradiating the other side of the applied surface with ultraviolet rays.

As described above, selective reflected wave length of circular polarized light is determined for cholesteric liquid crystal on the basis of the index of refraction thereof and the cholesteric pitch. In addition, the selective reflected wave length band is determined by the birefringence. That is to say, the selective reflected wave length and wave length band can be controlled through the selection of the liquid crystal material and by changing the concentration of the chiral agent.

Furthermore, in the case where a change in the cholesteric pitch can be formed in the direction of the thickness, the selective reflected wave length band is broadened and the reflected light thereof exhibits more whiteness. At this time, an expansion of the pitch to the longer wave length side becomes particularly significant, and the center wave length shifts to the longer wave length side.

Fabrication and fixation of such cholesteric liquid crystal, in the case of a general thermotropic liquid crystal, are carried out through the application of liquid crystal molecules or a liquid crystal polymer solution, or in some cases, through the respective steps of curing the solution, orientating and cross-linking of liquid crystal by heating to an appropriate temperature, maintaining the temperature and cooling the liquid crystal. In the case of lyotropic liquid crystal, fabrication and fixation are carried out through the respective steps of the application of liquid crystal molecules or a liquid crystal polymer solution, curing the solution, orientating and cross-linking of liquid crystal. The fixation of liquid crystal molecules is primarily carried out through the polymerization of polymerizing liquid crystal monomers or the cross-linking of cross-linking liquid crystal molecules, and thereby, the structure of liquid crystal is changed due to an increase in the temperature or liquid crystal is insolubilized into a solvent, and thus, the object is achieved.

According to the present invention, in the case where a reaction occurs unevenly because a polymerization reaction of any of liquid crystal monomers, cross-linking liquid crystal molecules and a chiral component progresses faster than the others at the time of this fixation of liquid crystal, or in the case where polymerization gradually progresses from either side, the base side of the applied liquid crystal layer or the air side (surface side), the concentration of molecules that have not yet reacted from among the liquid crystal molecules or chiral component of which the reaction rate is slower becomes high in the polymerization of such liquid crystal molecules or in the cross-linking reaction. Therefore, molecules that have not reacted move through concentration balance of molecules that have not yet reacted on the basis of the difference in the concentration in the direction of the thickness. Accordingly, when polymerization or cross-linking reaction is finally completed, the concentration ratio of the liquid crystal molecules to the chiral component is changed in the direction of the thickness, and as a result, a region where the cholesteric pitch is changed can be formed in the direction of the thickness. As a result, a cholesteric liquid crystal layer, which has a selective reflected wave length band that is broader than that in the initial state, can be formed.

That is to say, in the case where liquid crystal molecules polymerize faster than those the side where polymerization is initiated do, the chiral component is enriched on the other side, and thereby, the cholesteric pitch becomes greater on the side where the polymerization is initiated and becomes smaller on the other side in comparison with the case where a uniform reaction occurs, and as a result, a structure where the cholesteric pitch gradually becomes narrower is formed. In addition, in the case where the chiral component polymerizes faster than those the side where polymerization is initiated do, a structure is gained where a change in the pitch becomes opposite to the above-described case.

When the mixture of the liquid crystal molecules and the chiral component reacts, it is necessary to limit the place where the reaction starts in order to make the reaction start from one surface side as described above.

Here, though one example thereof is cited and described, the invention is not limited thereto. An appropriate amount of ultraviolet ray polymerization initiator is added to liquid crystal molecules and a chiral component of which the ratio has been set in advance so that the center value of the selective reflected wave length of circular polarized light becomes an appropriate wave length, the resulting material is dissolved and mixed into a solvent, and then is applied to a base film, the solvent is dried and removed, and one side of the liquid crystal layer is exposed to ultraviolet rays having a low intensity, and thereby, polymerization is achieved. It is clear that the ultraviolet ray polymerization initiator that is located on the surface side that is exposed to light absorbs a large amount of ultraviolet rays when the liquid crystal layer is exposed to ultraviolet rays having a low intensity, and reaction progresses faster on this side. In addition, the ultraviolet ray polymerization initiator on the surface side which is exposed to light is consumed as the reaction progresses, and thus, the transmittance of ultraviolet rays increase, allowing ultraviolet rays to reach deeper. In this case, when the reaction occurs in an oxygen atmosphere, an oxygen impediment is caused, allowing the reaction to rarely occur without a certain level or higher of radicals. That is to say, the progress of polymerization can be limited only to the vicinity of the surface on the side that is exposed to light. This is not limited to ultraviolet rays, and the types of light are not particularly limited as long as the intensity in the direction of the thickness due to absorption easily changes.

It is difficult to generate a difference in the temperature in polymerization by heating, and therefore, it is practically impossible to control the place where the initiator cleaves. In addition, in the case where ultraviolet rays in a wave length range that tend to reach deep and an initiator that tends to react with light in this wave length are selected, the reaction distribution of the initiator is not easily generated and the reaction distribution in the direction of the thickness is not easily formed.

Movement of the components that have not been reacted on the basis of a difference in the temperature is accelerated when the level of freedom of the molecules is higher, and accordingly, it becomes easier to gain a change in the cholesteric pitch. Accordingly, molecular motion is made active by heating at the time of polymerization or cross-linking reaction, and thereby, movement of the components that have not been reacted may be accelerated.

As described above, in the case of exposure to ultraviolet rays, patterning is relatively easy. This is because a mask where a pattern (representing authentication information) is formed in advance so that a predetermined amount of ultraviolet rays transmit is prepared, and exposure to light may be carried out through this mask. It is possible to easily fabricate or gain such a mask in accordance with a vapor deposition·etching method or through printing.

As for the exposure to light through a mask, a method for exposing an image to light by inserting a mask in an optical system for exposure to light, and a method for exposing an object, with which a mask is substantially made to make contact, to light can be cited. In the case of the former, it is possible to form a two-dimensional pattern by preventing the position of the pattern that is projected from the mask from shifting from the position of the object to be exposed to light. In the case where the object to be exposed to light and the mask pattern are moved in one direction relative to each other, an exposure pattern in stripe form is gained. In addition, in the case of the latter, a mask and an object to be exposed to light are substantially made to make contact with each other when exposed to light, and therefore, the mask pattern becomes approximately the same as the exposure pattern. As described above, heat may be applied at the time of such exposure to light.

In the object that has been exposed to light in accordance with the above-described method, expansion of the cholesteric pitch occurs in the exposed portion, and a region having an expanded wave length band that has been changed from the original selective reflected wave length band is formed, whereas the remaining regions are not fixed. Therefore, the region that has not been reacted is exposed with intensive ultraviolet rays, and thereby, reaction is made to occur without causing such a change in the pitch, and thus, the original cholesteric pitch can be fixed.

As a result, a film (sheet) having a patterned selective reflected wave length band is completed.

In addition, heat is not applied at the time of exposure of the components that have not been reacted to light. The cholesteric pitch can be fixed to the one that is approximately uniform in the direction of the thickness in accordance with a method for exposure to light in a nitrogen atmosphere.

In this case, naturally, a region having a constant cholesteric pitch may be first formed by exposing the pattern to intensive ultraviolet rays, and after that, a region having a broad selective reflected wave length band may be formed through exposure to weak ultraviolet rays. In this case, however, intensive light is initially radiated, and therefore, the sharpness of the pattern tends to be poor due to the influence of light that has been leaked around the pattern, and thus, there is a possibility that this may not be beneficial for the formation of a microscopic pattern. In addition, the substance that has not been reacted in the region that has been exposed to weak light may be again exposed to intensive ultraviolet rays in order to react afterwards, and in this case, there is little optical influence on the formed pattern because the reaction for forming the pitch has already been completed.

Such weak light/intensive light can be very easily implemented at the time of exposure to ultraviolet rays. That is to say, an appropriate level of ultraviolet ray absorbing properties may be provided to the base film to which liquid crystal molecules and a chiral component have been applied. That is to say, exposure to ultraviolet rays from the base side becomes a weak exposure to light due to the absorption by the base while the exposure to light from the opposite side becomes an intensive exposure to light due to the lack of a base. Such a base may be, for example, a film having absorbing properties in the ultraviolet ray range, and for example, a polyethylene terephthalate (PET) film and the like can be cited. In addition, an appropriate amount of ultraviolet ray absorber may be mixed into a film that is transparent to ultraviolet rays. In the case of the former, the amount of transmitted ultraviolet rays can be controlled by changing the thickness of the film, and in the case of the latter, it can controlled by changing the amount of added ultraviolet ray absorber.

It is very advantageous to use a patterned mask which is made to make contact with a base in the exposure of such a base to light. The pattern can be precisely exposed to weak ultraviolet rays by making a mask make contact with the base when being exposed to light, and at the same time, pollution of the mask is small and the frequency the masks are exchanged can be lowered, which is also preferable from the point of view of cost in comparison with the case where the mask is made to make contact with the side opposite to the base. Alternatively, a printing pattern of an ultraviolet ray absorbing substance is formed in advance on the surface opposite to the side of the base to which liquid crystal molecules are applied, and thereby, a mask may be gained.

A sheet with anti-counterfeit functions according to the present invention can be attached to a variety of articles, which are not limited to specific articles. It may, for example, be attached to an authentication card. As for the authentication cards, prepaid cards, credit cards, ID cards and the like can be exemplified. In addition, it may be attached to drivers' license cards, passports, staff identity cards or the like.

In addition, it may be used as a bar code label. One-dimensional or two-dimensional bar code information can be formed in an authentication region. Bar code labels can usually be fabricated through a printing process or the like, and therefore, can easily be perceived with the eye, and the position of the bar code encryption can be easily specified and information can be easily read, making duplication very easy. In comparison with labels that are fabricated by combining light absorbing/non-absorbing patterns through such conventional printing, the sheet with anti-counterfeit functions according to the present invention that is utilized as a bar code label has a high level of anti-counterfeit functions.

An authentication system using a sheet with anti-counterfeit functions according to the present invention is characterized by having:

a light source for radiating light that has a wave length that is reflected from either region, an authentication region or a non-authentication region, and is not reflected from the other region; and determination means for reading light reflected from either region, and determining authenticity or fakeness.

Such an authentication system allows authentication information that is formed on a sheet with anti-counterfeit functions to be automatically read. That is to say, the sheet is irradiated with a light beam having a specific wave length with the reflected light being read, and thereby, the authentic information that is formed in an authentication region can be read, and whether this is authentic or fake can be determined.

According to the present invention, selective reflection of circular polarized light due to a cholesteric liquid crystal layer can be gained with one liquid crystal layer which can be patterned, and therefore, anti-counterfeit means which makes counterfeiting extremely difficult can be provided.

<Other Embodiments>

There may be at least one region, which may be one region or two or more regions, where the selective reflected wavelength band is different. In the case where, for example, three regions, a first authentication region, a second authentication and a non-authentication region, are provided in the configuration, the selective reflected wavelength bands of the first and second authentication regions are different from that of the non-authentication region. In addition, the selective reflected wavelength bands of the first and second authentication regions may be different from each other. Furthermore, the configuration may be separated into four or more regions.

DESCRIPTION OF THE PREFERRED EMBODIMENTS

<Configuration of Sheet with Anti-Counterfeit Functions>

Figure 1:
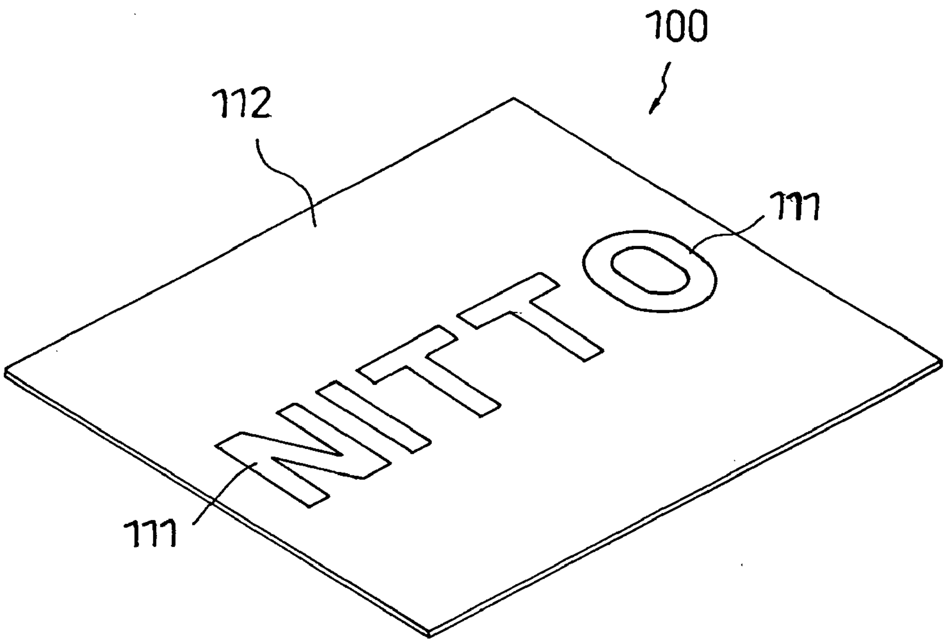
FIG. 1 is a frontal diagram showing a sheet with anti-counterfeit functions.

A sheet with anti-counterfeit functions according to a preferred embodiment of the present invention is described in reference to the drawings. FIG. 1 is a frontal diagram showing a sheet 100 with anti-counterfeit functions, wherein 112 indicates a selective reflected band expanding region of circular polarized light and 111 indicates a normal region in a cholesteric liquid crystal layer 110. In FIG. 1, a pattern can be formed by combining normal region 111 and band expanding region 112 within a plane. Here though letters are used as an example of authentication example, symbol marks, bar codes and the like may be used.

According to the present invention, either band expanding region 112 or normal region 111 can be used as an authentication region while the other is used as a non-authentication region.

Figure 2:
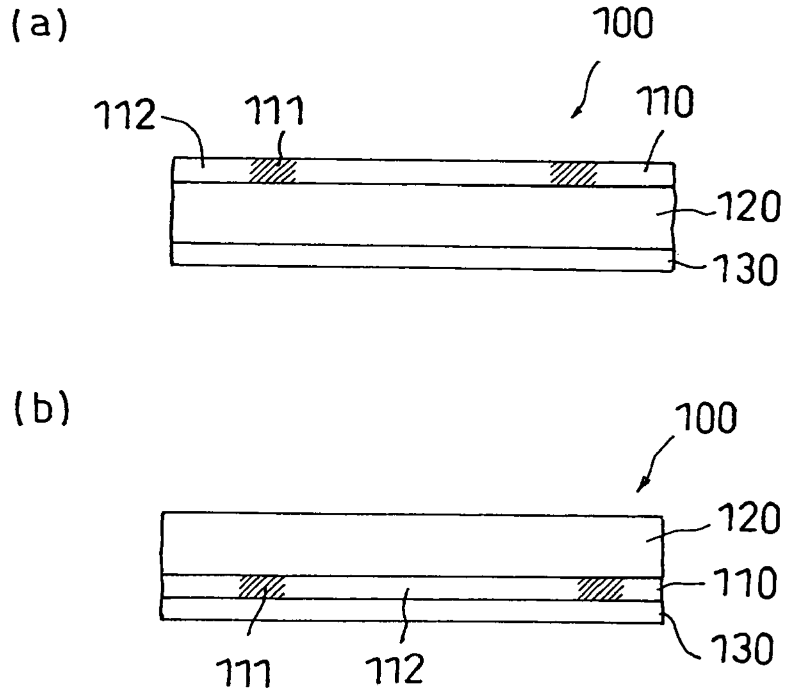
FIGS. 2(*a*) and 2(*b*) are cross sectional diagrams showing sheets with anti-counterfeit functions.

FIGS. 2(*a*) and 2(*b*) are cross sectional diagrams showing the sheets 100 with anti-counterfeit functions according to the present invention. In FIG. 2, 110 indicates a cholesteric liquid crystal layer, 111 indicates a normal region, and 112 indicates a band expanding region. In addition, the sheet 100 with anti-counterfeit functions of the present invention may have a base 120 for holding cholesteric liquid crystal layer 110, if necessary. Furthermore, the sheet 100 with anti-counterfeit functions of the present invention has an adhesive layer 130, and a mold release sheet 131 may be provided on the top surface thereof. In addition, a light absorbing layer 140 may be provided, if necessary. In addition, a colored base may be used both as the light absorbing layer 140 and base 120. FIG. 2(*a*) shows a case where cholesteric liquid crystal layer 110 is on the side of base 120 opposite to adhesive layer 130, while FIG. 2(*b*) shows a case where cholesteric liquid crystal layer 110 is on the same side as adhesive layer 130. In the case where the selective reflection of circular polarized light from cholesteric liquid crystal layer 110 is confirmed using another optical means, the birefringence of base 120 should be as small as possible in the configuration shown in FIG. 2(*b*).

The brightness of reflected light is higher, and a pattern can be seen with sharp contrast in band expanding region 112, in comparison with normal region 111. In addition, the selective reflected wavelength band is broad in band expanding region 112, and therefore, blue shift caused by Bragg diffraction when reflected light is seen diagonally is small and barely changes, while the center wavelength of reflected light shifts to the shorter wavelength side because of the occurrence of blue shift in normal region 111, where a change in color can be observed.

Furthermore, light reflected from these cholesteric liquid crystal layers is circular polarized light, and therefore, whether or not circular polarized light is reflected can be easily confirmed using a circular polarizing plate having a different polarity. In the case where circular polarizing plates which look similar are fabricated through printing, for example, light transmits through a circular polarizing plate having either polarity and is attenuated to approximately half by the circular polarizing plate when there are no polarizing properties. In contrast to this, in the case of the present invention, light transmits through a circular polarizing plate having one polarity with barely any attenuation, while light is absorbed by and barely transmits through a circular polarizing plate having the other polarity, and therefore, a high level of anti-counterfeiting can be provided.

The circular polarized light that has transmitted through the cholesteric liquid crystal layer reaches light absorbing layer 140, which is provided on the lower side, and is absorbed, so that only reflected light can be seen. Here, installment of this light absorbing layer is arbitrary, and is not particularly required in the case where the object on which a sheet with anti-counterfeit functions of the present invention is used is colored.

The center wavelength of the band reflected from normal region 111 of the cholesteric liquid crystal layer can be freely set. The center wavelength is usually set in the visual light region because it is seen by the human eye, and so that blue shift can be identified. In order to gain high contrast in the visible light region, however, it can be set in the ultraviolet ray region, or it may be in, for example, the infrared ray region in the case where a sheet with anti-counterfeit functions of the present invention is used as an authentication system where reading is carried out by a machine.

In addition, according to the present invention, one cholesteric liquid crystal layer is patterned, and the sheet is characterized by being very thin, because it is made of only one layer. As for the patterning of circular polarized light, in the case where cholesteric liquid crystal layers having selective reflected wavelength bands of circular polarized light of which the bands are different are made to adhere to each other by making portions of the region overlap in order to gain a viewing angle which is similar to that of the present invention, a step is made along the border of the cholesteric liquid crystal layers. In addition, polarized light that has been reflected due to the effects of the overlapping liquid crystal layers partially transmits through a circular polarizing plate of which the polarity essentially does not allow light to transmit so as to be seen, and therefore, the difference between such a sheet and the sheet according to the present invention is clear.

It can be seen from the above description that counterfeiting of the sheet with anti-counterfeit functions of the present invention is very difficult in accordance with other methods. The pattern consists of specific symbols or letters, and its authenticity or fakeness can be easily determined by anyone who sees it, and therefore, the sheet with anti-counterfeit functions of the present invention can be used as very effective authentication means.

In addition, the sheet with anti-counterfeit functions of the present invention has a high level of anti-counterfeiting even when used alone, and it may be combined with another method for anti-counterfeiting, so that the level of anti-counterfeiting can be increased. It can be combined with, for example, a hologram image, as shown in U.S. Pat. No. 5,574,790, in the same manner as shown in Japanese Patent Application Laid-open No. 11-151877. In addition, a transparent birefringence layer having a region where the retardation is different, or a transparent birefringence layer having a region where the azimuth of the lagging axis is different may be provided on the cholesteric liquid crystal layer.

The sheet 100 with anti-counterfeit functions according to the present invention is utilized by being made to adhere to a product, a document or the like of which counterfeiting is desired to be prevented via an adhesive layer 130. The product of which counterfeiting is desired to be prevented is not particularly limited. The sheet can be made to adhere directly or indirectly to any such product, so as to work to prevent counterfeiting. At this time, adhesive layer 130 may be made of an adhesive or a pressure sensitive adhesive. The sheet with anti-counterfeit functions according to the present invention can be used by being made to adhere to a prepaid card, a credit card, an ID card or the like.

In the case where the sheet 100 with anti-counterfeit functions of the present invention is used for an authentication system where reading is carried out by a machine, as described above, the reflected band of normal region 111 is set as the wavelength band where light for authentication is not reflected, and an expanded region 112 of the reflected band is set as the band where light is reflected, and thereby, a specific pattern, a bar code or the like that has been formed as an authentication region can be read via an apparatus.

<Manufacturing Process for Sheet with Anti-Counterfeit Functions>

Figure 3:
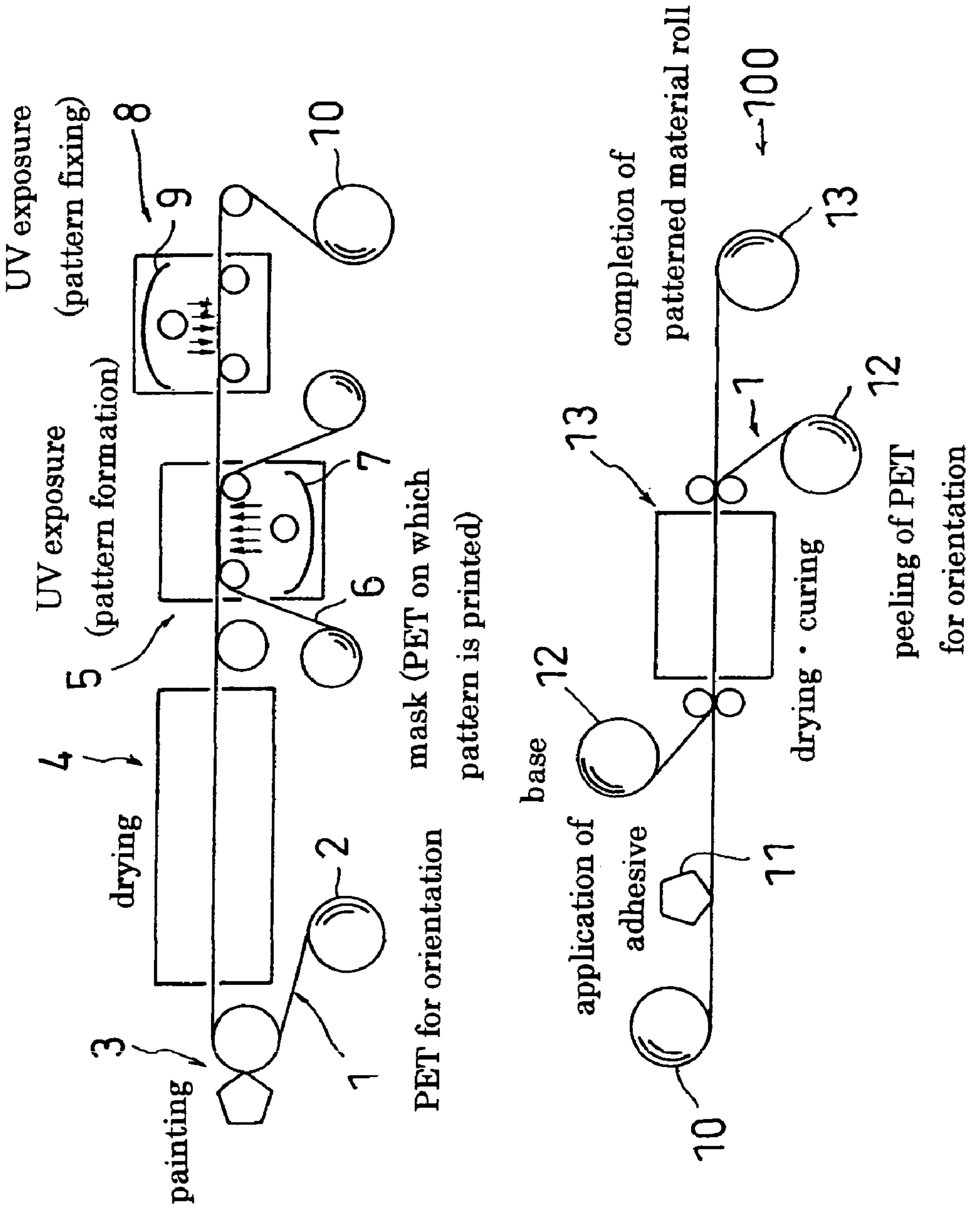
FIG. 3 is a diagram showing a manufacturing process for a sheet with anti-counterfeit functions.

Next, FIG. 3 shows an example of a manufacturing process for the sheet 100 with anti-counterfeit functions as shown in FIGS. 1 and 2. The manufacturing process has already been described in detail, and therefore, is briefly described here. PET 1 for orientation is continuously drawn from a roll 2 around which PET 1 for orientation with a predetermined width is wound, and cholesteric liquid crystal is applied by means of an application apparatus 3. After the cholesteric liquid crystal has been applied, the liquid crystal layer is dried by means of a drying apparatus 4. Subsequently, a pattern (authentication information) is formed by means of a first UV exposure apparatus 5. A mask feeding apparatus 6 for forming a pattern is provided, and the cholesteric liquid crystal layer is exposed to ultraviolet rays from a light source 7 through a mask from one side. Subsequently, the cholesteric liquid crystal layer on which a pattern is exposed to light is fed into a second UV exposure apparatus 8 and exposed to ultraviolet rays from a light source 9. The entirety of the cholesteric liquid crystal layer is irradiated with these ultraviolet rays from the other side so that the pattern is fixed. As a result, PET 1 for orientation and the cholesteric liquid crystal layer are rolled up around a roll 10 in such a state as to be layered on top of each other.

Next, an adhesive is applied to the rolled up cholesteric liquid crystal layer by means of an adhesive applying apparatus 11. Subsequently, a base 12 is layered on the surface of the adhesive layer, and after that, the adhesive is dried by means of a drying and curing apparatus 13. PET 1 for orientation is peeled from the cholesteric liquid crystal layer, and then, rolled up around a roll 12. After PET 1 for orientation has been peeled, the sheet 100 with anti-counterfeit functions according to the present invention is completed and rolled up into a roll 13.

<Configuration of Authentication System>

Figure 4:
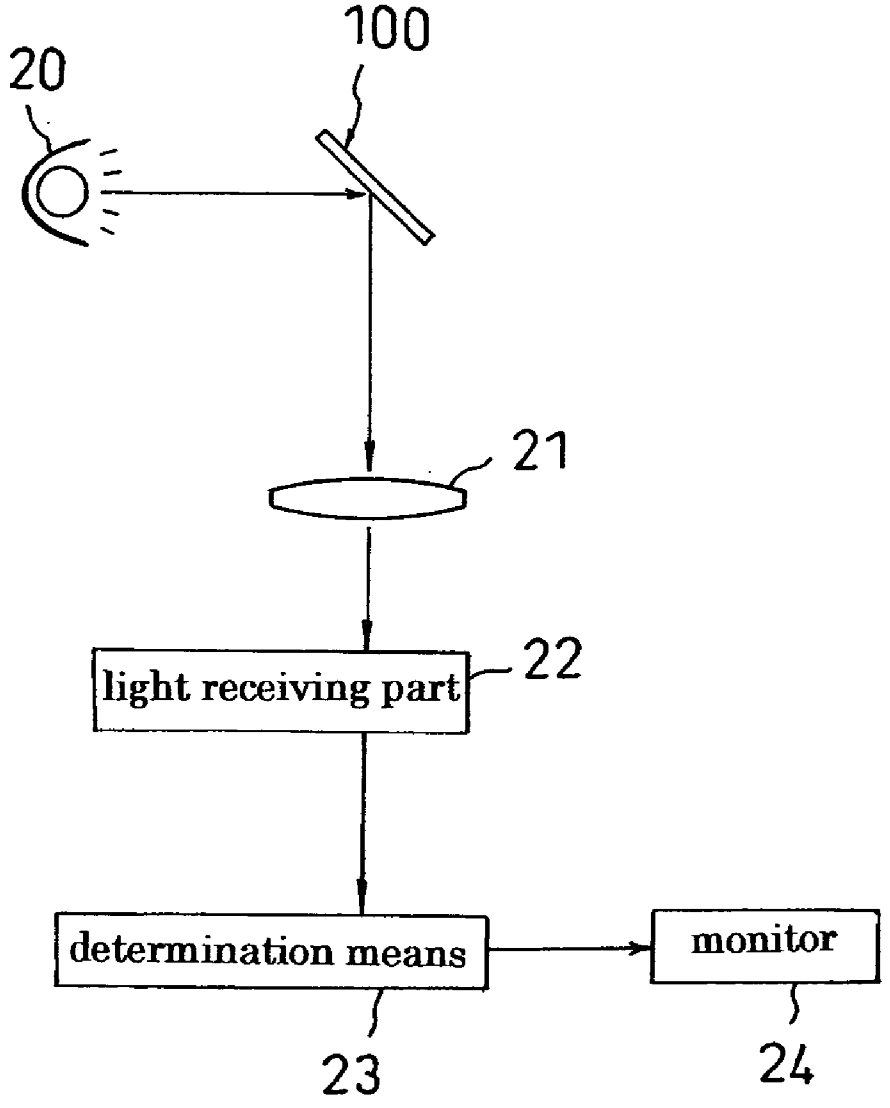
FIG. 4 is a schematic diagram showing the configuration of an authentication system.

Next, the schematic diagram of FIG. 4 shows the configuration of an authentication system in the case where a sheet with anti-counterfeit functions according to the present invention is used. An authentication region and a non-authentication region where the selective reflected wavelength bands are different are formed in the sheet 100 with anti-counterfeit functions. Light source 20 radiates light having such a wavelength that light that hits the authentication region is reflected, and light that hits the non-authentication region is not reflected. The radiated light hits the sheet 100 with anti-counterfeit functions from a predetermined angle, and the light that is reflected from the sheet 100 with anti-counterfeit functions is received by a light receiving part 22 (CCD sensor or the like) through an image forming lens 21. Determination means 23 analyses authentication information that has been received by light receiving part 22 and determines authenticity or fakeness. The determined results are displayed on a monitor 24.

Here, the wavelength of light source 20 may be such a wavelength that light is reflected only from the non-authentication region and light is not reflected from the authentication region. The type of light source 20 is not particularly limited. In addition, the optical system is not limited to the configuration shown in the figure.

EXAMPLES AND COMPARISON EXAMPLES

In the following, Examples and Comparison Examples are cited in order to describe the present invention, but the present invention is not limited thereto.

Example 1

[Fabrication of Cholesteric Liquid Crystal Sheet (1)]

There were weighed 2.85 g of a photo-polymerizing nematic liquid crystal monomer and 0.15 g of a chiral agent, which are both commercially available, respectively and they were completely dissolved in 7 g of a solvent (cyclopentanone), and after that, 0.15 g of a photo-polymerization initiator Irgacure 907 was dissolved therein to prepare an application liquid.

This application liquid was applied to a commercially available PET film using a wire bar in such a manner that a thickness after drying becames 4 μm, and the solvent was dried, and after that, this liquid crystal monomer was heated for 2 minutes at 100° C.

After that, a mask where a stripe pattern is formed on crystal glass which has light blocking portions having a width of 5 mm made of a chromium vapor deposited layer and light transmitting portions having a width of 5 mm where chromium has been removed through etching at equal intervals was placed so as to make contact with the PET, and the PET side was exposed to ultraviolet rays through the mask which was heated to 100° C. At this time, the intensity of illumination of ultraviolet rays was 50 $mW/cm^2$, and the time for exposure was 2 seconds. After that, the mask was peeled and the liquid crystal side was exposed to ultraviolet rays at an intensity of illumination of 50 $mW/cm^2$, and a time for exposure of 2 seconds, and thereby, a cholesteric liquid crystal sheet (1) was fabricated.

As for the color of reflection of the gained cholesteric liquid crystal sheet (1), the portions that were first exposed to ultraviolet rays through the mask exhibited approximately white reflection, and the portions that were in the shadow of the mask exhibited green frontal reflection, and these were formed at intervals of 5 mm, which is the same as in the mask. In addition, the color of light reflected from the portions that correspond to the light blocking portions of the mask changed from green to bluish green to blue as the angle of viewing became greater when seen diagonally. In contrast to this, the transmission portions of the mask showed almost no change.

[Fabrication of Cholesteric Liquid Crystal Sheet (2)]

A cholesteric liquid crystal sheet (2) was fabricated in exactly the same manner as the cholesteric liquid crystal sheet (1), except that the light blocking portions of the mask that was placed so as to make contact with the PET was crystal glass where a pattern "NITTO" was formed.

In the gained cholesteric liquid crystal sheet (2), the letter portions of "NITTO" exhibited green frontal reflection, and the remaining portions exhibited approximately white reflection. In addition, the color of light reflected from the letter portions changed from green to bluish green to blue as the angle of viewing became greater when seen diagonally. In contrast to this, the remaining portions showed almost no change.

[Fabrication of Cholesteric Liquid Crystal Sheet (3)]

An application liquid was prepared in exactly the same manner as the cholesteric liquid crystal sheet (1), applied to a PET film in exactly the same manner as cholesteric liquid crystal sheet (1) and dried, and after that, the liquid crystal monomer was heated for 2 minutes to 100° C.

After that, the liquid crystal side was exposed to ultraviolet rays at an intensity of illumination of 50 $mW/cm^2$ and an exposure time of 2 seconds while being heated to 100° C. without placing a mask on the PET film, and thus, a cholesteric liquid crystal sheet (3) was fabricated.

As for the selected wavelength of the gained cholesteric liquid crystal sheet (3), the entire surface exhibited green frontal reflection, and no pattern was formed. In addition, the color changed from green to bluish green to blue as the angle of viewing became greater when the reflected light was seen diagonally.

[Manufacture of Cholesteric Liquid Crystal Sheet (4)]

An application liquid was prepared in exactly the same manner as in the manufacture of cholesteric liquid crystal sheet (1), which was applied to a PET film in exactly the same manner as cholesteric liquid crystal sheet (1) and dried, and after that, the liquid crystal monomer was heated for 2 minutes to 100° C.

After that, the PET side was exposed to ultraviolet rays at an intensity of illumination of 50 $mW/cm^2$ and an exposure time of 2 seconds while being heated to 100° C. without placing a mask on the PET film, and thus, a cholesteric liquid crystal sheet (4) was fabricated.

As for the selected wavelength of the gained cholesteric liquid crystal sheet (4), the entire surface exhibited pale yellow to white frontal reflection, and no pattern was formed. The color of the reflection barely changed when the reflected light was seen diagonally.

[Fabrication of Cholesteric Liquid Crystal Sheet (5)]

A sheet A was fabricated in exactly the same manner as cholesteric liquid crystal sheet (3), except that an application liquid that was gained by respectively weighing 2.85 g of a photo-polymerizing nematic liquid crystal monomer and 0.15 g of a chiral agent, which are both commercially available, and completely dissolving them in 7 g of a solvent (cyclopentanone), and after that, dissolving 0.15 g of a photo-polymerization initiator Irgacure 907 was used. As for the selected wavelength of the gained sheet A, the entire surface exhibited green frontal reflection, and no pattern was formed. In addition, the color changed from green to bluish green to blue as the angle of viewing became greater when the reflected light was seen diagonally.

Next, a sheet B was fabricated in exactly the same manner as cholesteric liquid crystal sheet (3), except that an application liquid that was gained by respectively weighing 2.875 g of a photo-polymerizing nematic liquid crystal monomer and 0.125 g of a chiral agent, which are both commercially available, and completely dissolving them in 7 g of a solvent (cyclopentanone), and after that, dissolving 0.15 g of a photo-polymerization initiator Irgacure 907 was used. As for the selected wavelength of the gained sheet B, the entire surface exhibited red frontal reflection, and no pattern was formed. In addition, the color changed from red to yellow to green as the angle of viewing became greater when the reflected light was seen diagonally.

A sheet C was fabricated in exactly the same manner as cholesteric liquid crystal sheet (3), except that an application liquid that was gained by respectively weighing 2.825 g of a photo-polymerizing nematic liquid crystal monomer and 0.175 g of a chiral agent, which are both commercially available, and completely dissolving these in 7 g of a solvent (cyclopentanone), and after that, dissolving 0.15 g of a photo-polymerization initiator Irgacure 907 was used. As for the selected wavelength of the gained sheet C, the entire surface exhibited blue frontal reflection, and no pattern was formed. In addition, the color changed from blue to indigo to purple as the angle of viewing became greater when the reflected light was seen diagonally.

An adhesive was applied to the entire surface on the liquid crystal side of sheet A, which was made to adhere to a PET film, and then, the PET base was peeled from sheet A so as to transfer the cholesteric liquid crystal layer. Next, an adhesive sheet without a base was made to adhere to the liquid crystal surface side of sheet B in stripe form with a width of 5 mm, and this was made to adhere to the surface to which the liquid crystal surface of sheet A was transferred, and then, the liquid crystal layer of sheet B was peeled only from the portions where the adhesive layer intervened. Furthermore, in the same manner, an adhesive sheet without a base was made to adhere to the liquid crystal surface side of sheet C in stripe form with a width of 5 mm, and this was carefully made to adhere to the surface to which the liquid crystal surfaces of sheets A and B were transferred in such a manner that the adhesive layers that were formed in stripe form on the liquid crystal surfaces of sheet B and sheet C coincided, and then, the liquid crystal layer of sheet C was peeled only from the portions where the adhesive layer intervened, and thus, a cholesteric liquid crystal sheet (5) was fabricated.

As for the selective wavelength of the gained cholesteric liquid crystal sheet (5), a pattern in stripe form was formed, where portions made of only the liquid crystal layer that was transferred from sheet A and exhibited green frontal reflection in stripe form with a width of approximately 5 mm, and portions made of the liquid crystal layers that were transferred from sheets A, B and C and exhibited white frontal reflection were alternately formed. The color of reflection of the portions that were made of only the liquid crystal layer that was transferred from sheet A changed from green to bluish green to blue, while the portions that were made of the liquid crystal layers that were transferred from sheets A, B and C exhibited a slight tinge of blue and barely changed when reflected light was seen diagonally.

Example 2

A black paint was applied to the side opposite to the liquid crystal surface of the PET film of cholesteric liquid crystal sheet (1), and furthermore, an adhesive layer was formed so as to provide a sheet with anti-counterfeit functions according to Example 1.

Example 3

A black paint was applied to the side opposite to the liquid crystal surface of the PET film of the cholesteric liquid crystal sheet (2), and furthermore, an adhesive layer was formed so as to provide a sheet of -counterfeit functions according to Example 2.

Comparison Example 1

A black paint was applied to the side opposite to the liquid crystal surface of the PET film the of cholesteric liquid crystal sheet (3), and furthermore, an adhesive layer was formed so as to provide a sheet with anti-counterfeit functions according to Comparison Example 1.

Comparison Example 2

A black paint was applied to the side opposite to the liquid crystal surface of the PET film of cholesteric liquid crystal sheet (4), and furthermore, an adhesive layer was formed so as to provide a sheet with anti-counterfeit functions according to Comparison Example 2.

Comparison Example 3

A black paint was applied to the side opposite to the surface, to which the liquid crystal was transferred, of the PET film of cholesteric liquid crystal sheet (5), and furthermore, an adhesive layer was formed so as to provide a sheet with anti-counterfeit functions according to Comparison Example 3.

Comparison Example 4

A reflective layer was formed of aluminum on a PET film by means of vacuum vapor deposition, and masking tape having a width of 5 mm was provided on the surface thereof in stripe form at intervals of 5 mm, and after that, a clear green lacquer based paint was applied and dried, and then, the masking tape was peeled. After that, an adhesive layer was formed on the side opposite to the surface to which a clear green lacquer coating material; was applied so as to provide a sheet with anti-counterfeit functions according to Comparison Example 4.

Example 4

A commercially available hologram sheet was made to adhere to the liquid crystal surface of the sheet with anti-counterfeit functions according to Example 1 using an adhesive so as to provide a sheet with anti-counterfeit functions according to Example 3.

Example 5

A commercially available hologram sheet was made to adhere to the liquid crystal surface of the sheet with anti-counterfeit functions according to Example 2 using an adhesive so as to provide a sheet with anti-counterfeit functions according to Example 4.

Comparison Example 5

A silver reflecting plate was made to adhere to a commercially available hologram sheet via an adhesive layer, and then, an adhesive layer was formed on the silver reflecting plate so as to provide a sheet with anti-counterfeit functions according to Comparison Example 5.

Comparison Example 6

A commercially available hologram sheet was made to adhere to the liquid crystal surface of the sheet with anti-counterfeit functions of Comparison Example 1 using an adhesive, so as to provide a sheet with anti-counterfeit functions according to Comparison Example 6.

Comparison Example 7

A commercially available hologram sheet was made to adhere to the liquid crystal surface of the sheet with anti-counterfeit functions of Comparison Example 2 using an adhesive, so as to provide a sheet with anti-counterfeit functions according to Comparison Example 7.

Comparison Example 8

A commercially available hologram sheet was made to adhere to the liquid crystal surface of the sheet with anti-counterfeit functions of Comparison Example 3 using an adhesive, so as to provide a sheet with anti-counterfeit functions according to Comparison Example 8.

[Comparison Test]

When the sheets with anti-counterfeit functions according to Examples 1 and 2, as well as Comparison Examples 1 to 4, were looked at, a pattern of green and white stripes as that described above was confirmed in Example 1 and Comparison Examples 3 and 4, and green letters “NITTO” against a white background were confirmed in Example 2, while no pattern was seen in Comparison Examples 1 and 2. However, the portion exhibiting green reflection gradually tinged blue when seen diagonally in the Examples, while there was no change in Comparison Example 4, where the portion stayed green.

However, the liquid crystal layer formed a completely flat surface in Examples, while a clear step was seen in the patterned portion in Comparison Example 3.

In addition, the pattern in stripe form of the liquid crystal layer on the lower side and the letters "NITTO" were respectively seen through a hologram in Examples 3 and 4, while nothing was confirmed in Comparison Examples 5, 6 and 7. In addition, lifting occurred where the hologram layer and the liquid crystal layer were made to adhere to each other in Comparison Example 8, making it very difficult to see.

In addition, in the case where a counterclockwise circular polarizing plate was used, reflected light was seen brightly through the circular polarizing plate in all of the examples and Comparison Examples except Comparison Examples 4 and 5. In contrast, the amount of light that transmitted was greatly reduced in Comparison Examples 4 and 5. In addition, in the case where a clockwise circular polarizing plate was used, reflected light was blocked and did not transmit in all of the examples and Comparison Examples except Comparison Examples 4 and 5. In contrast, reflected light of which the amount was approximately the same as that when a counterclockwise circular polarizing plate was used was seen in Comparison Examples 4 and 5. That is to say, the reflected light was a left circular polarized light in all of Examples and Comparison Examples, except in Comparison Examples 4 and 5, while the reflected light did not have circular polarity in Comparison Examples 4 and 5.

It is very difficult to gain the optical functions of the present invention with another layer, and in addition, it is very difficult to implement such structures and properties in accordance with a method other than those of the present invention. In addition, it is possible to implement a high level of anti-counterfeiting by using a sheet with anti-counterfeit functions of the present invention. Furthermore, it is also possible to make counterfeiting more difficult by combining the present invention with anti-counterfeiting means in accordance with another method.

What is claimed is:

1. A method of manufacturing a sheet with anti-counterfeit functions, comprising:

forming a transparent base having ultraviolet ray absorbing properties;

forming, on the transparent base, a cholesteric liquid crystal layer having an original selective reflected wavelength band in at least a visible region and having approximately uniform thickness, the forming of the cholesteric liquid crystal layer comprising applying a cholesteric liquid crystalline, polymerizing liquid crystal comprising at least nematic liquid crystal, a chiral agent and an ultraviolet ray reaction initiator to the transparent base;

forming an authentication region having a selective reflective wavelength band that is different from the original selective reflective wavelength band by irradiating one side surface of the cholesteric liquid crystal layer formed on the transparent base with ultraviolet rays which have been patterned on the basis of authentication information to be recorded; and after irradiating the one side surface of the cholesteric liquid crystal layer, then irradiating an other side surface of the cholesteric liquid crystal layer with ultraviolet rays through the transparent base to fix the authentication region formed by irradiating the one side surface of the cholesteric liquid crystal layer.

2. The manufacturing method for a sheet with anti-counterfeit functions according to claim 1, further comprising providing an adhesive layer on one side of the cholesteric liquid crystal layer.

3. The manufacturing method for a sheet with anti-counterfeit functions according to claim 2, further comprising providing a base between the cholesteric liquid crystal layer and the adhesive layer.

4. The manufacturing method for a sheet with anti-counterfeit functions according to claim 2, further comprising providing a light absorbing layer on said adhesive layer provided on one side of the cholesteric liquid crystal layer.

5. The manufacturing method for a sheet with anti-counterfeit functions according to claim 1, further comprising providing a transparent hologram layer on a surface side of the cholesteric liquid crystal layer.

6. An authentication system using a sheet with anti-counterfeit functions that has been manufactured in accordance with the manufacturing method for a sheet with anti-counterfeit functions according to claim 1, comprising:

the sheet with anti-counterfeit functions, the sheet including an authentication region and a non-authentication region;

a light source for radiating light having such a wavelength that the light is reflected from either the authentication region or the non-authentication region, and the light is not reflected from the other region; and determination means for reading light that is reflected from either region and determining authenticity or fakeness.

7. A method of manufacturing a sheet with anti-counterfeit functions, comprising:

forming a transparent base having ultraviolet ray absorbing properties;

applying a cholesteric liquid crystalline, polymerizing liquid crystal comprising at least nematic liquid crystal, a chiral agent and an ultraviolet ray reaction initiator to a surface of the transparent base;

irradiating one side of the applied surface with ultraviolet rays which have been patterned on the basis of authentication information to be recorded; and after irradiating the one side of the applied surface, then irradiating an other side of the applied surface with ultraviolet rays through the transparent base.

* * * * *